UNITED STATES PATENT OFFICE.

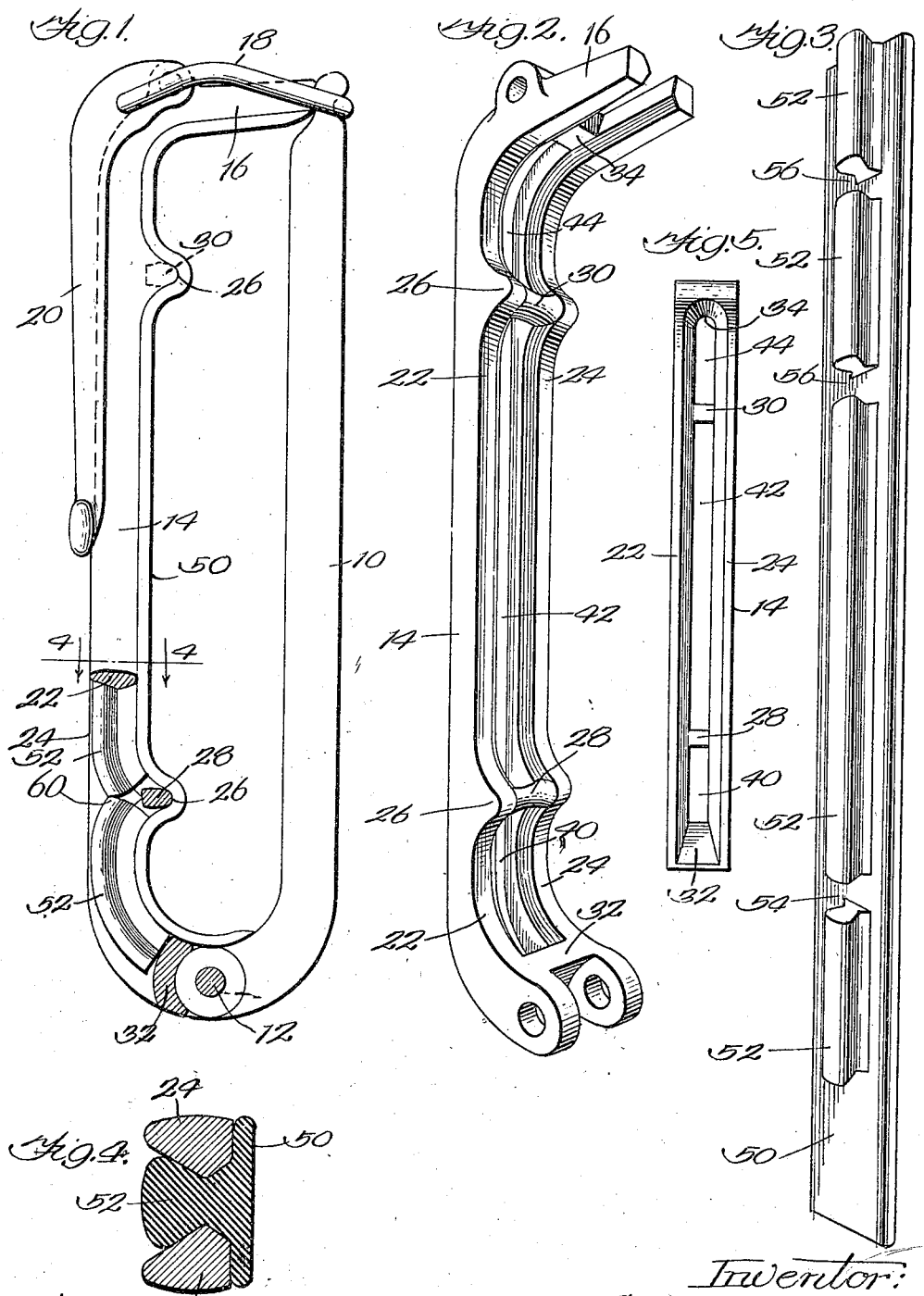

CLARENCE L. BAIR, OF ST. JOSEPH, MICHIGAN, ASSIGNOR TO AUTO SPECIALTIES MANUFACTURING CO., OF SAN FRANCISCO, CALIFORNIA, A CORPORATION OF CALIFORNIA.

VEHICLE-BOW-TOP HOLDER.

1,310,519.     Specification of Letters Patent.    Patented July 22, 1919.

Application filed January 28, 1918. Serial No. 214,063.

*To all whom it may concern:*

Be it known that I, CLARENCE L. BAIR, a citizen of the United States, residing at St. Joseph, in the county of Berrien and State of Michigan, have invented a certain new and useful Improvement in Vehicle-Bow-Top Holders, of which the following is a specification.

This invention relates to vehicle top bow holders of the type shown in various applications heretofore filed by me and in my Patent Number 1,010,110, granted November 28, 1911. The object of this invention is to provide a bow holder of this type with a rubber or other cushion lining at a minimum of expense without materially injuring the appearance of the device when applied to a car. The invention consists in so forming the swinging arm of the bow holder, which is the part to which it is important to apply the cushion, that a rubber cushion cut from a piece of that material made by the yard or by the mile and therefore cheaply made, may be readily applied to the swinging arm without the aid of extraneous securing devices; this, while producing a cushioned arm of reasonably good appearance. More particularly, the invention consists in the features and details of construction which will be hereafter more fully set forth in the specification and claims.

Referring to the drawings, in which similar numerals indicate the same parts throughout the several views, Figure 1 is a side view, partly in section of a vehicle bow holder of the general type referred to.

Fig. 2 is a perspective view of the swinging arm of the bow holder without the rubber cushion.

Fig. 3 is a perspective view of a rubber cushion member before it is applied to the swinging arm.

Fig. 4 is a sectional detail view on the line 4—4 of Fig. 1.

Fig. 5 is a back view of the swinging arm with the rubber cushion removed therefrom.

Again, referring to Fig. 1, the bow holder, as usual, has a fixed stock 10 securable by means, not shown in the drawings but well known in the art, to the side of a vehicle. To this rigid stock is pivoted at 12 a swinging arm 14 having its upper end 16 held in contact with the fixed stock, as shown, by the locking mechanism 18—20, well known in the art at the date of this application.

In order to carry out the invention of this application, the swinging arm 14 is cast in the form of two parallel bars 22 and 24, preferably shaped in detail as shown in Fig. 4, and spaced apart at the bow lifts 26, whose function is well understood in the art, by a plurality of cross members 28 and 30 and at other points by suitable cross members 32, and 34, when and as desired. The result of this construction is that, as is clearly shown in Fig. 5, the metallic part of the swinging arm is essentially a parallel sided member having generally rectangular perforations 40, 42 and 44 therein.

In order to equip the swinging arm just described with a rubber lining, a strip of flat rubber 50 is provided having formed on its back a T-shaped rib 52 of a size and shape to be compressed between the side bars 22 and 24 of the swinging arm to the position shown in Fig. 4. In the process of manufacturing this strip of rubber, this rib may be initially made continuous and then later cut away at the points desired or it may be made originally in the form shown in Fig. 3 with suitable notches 54, 56, 58 formed therein so shaped and arranged that when the rubber member of Fig. 3 is applied to the back of the holder in the manner shown in Fig. 1, the cross members 28, 30, etc., will lie in one of the notches just referred to, and the adjacent end portions of T-shaped rib 52 will abut each other as shown at 60 in Fig. 1, thus giving the back of the swinging arm the appearance of being continuous and therefore of neat construction. It will be further noted in this connection that in conforming the strip 50 to the irregularities of surface produced by the lifts 26 the ends of the ribs 52 are forced into locking relation with respect to the cross members 28 and 30 and thus the rib sections 52 are positively locked to all the walls of the perforations formed or partly formed by the cross members 28 and 30.

By the use of this invention, considerable weight of metal is saved over the use of the solid metal back swinging arm construction heretofore well known in the art. The rubber is much cheaper because it can be made in one continuous piece in large quantity, and the amount of labor required in assembling is less than in devices of the prior art at the date of this application.

Furthermore, no core is used in making the metal part of the swinging arm. This effects a very large saving over prior constructions because both the core and the core-box therefor used in the prior constructions with a solid metal back are very expensive. The pattern equipment on the device of this invention is about one-quarter that of prior constructions. Again as to the rubber, a saving is effected in that no molds are required to make the continuous strips.

Having thus described my invention, what I claim as new and desire to secure by Letters Patent, is:—

1. In a device of the class described, a member to be cushioned made up of two parallel bars, separated at intervals by cross members, a flat cushion member adapted to extend along said first mentioned member to cushion it, and a plurality of T-shaped ribs along said cushion member spaced apart at intervals corresponding to the cross bars in the member to be cushioned adapted, when forced into the spaces in the first member, to surround and conceal the cross members while securing the cushion member to the supporting member, for the purposes set forth.

2. In a vehicle bow top holder, a swinging arm having bow lifts thereon, there being along the length of the swinging arm a plurality of perforations extending from front to back thereof separated by cross bars at the bow lifts, a flat cushion member adapted to follow the contour of the swinging arm including the bow lifts, and a plurality of compressible T-shaped members on the cushion member entering the recesses in the swinging arm and locking on the sides thereof, the ends of said T-member abutting each over the cross member at the bow lifts, for the purposes set forth.

3. In a device of the class described, a member to be cushioned made up of two parallel sides spaced apart by cross members placed at suitable intervals, and a cushion member secured to one side of the member to be cushioned solely by the portions of the cushion material on the cushion member which pass through the openings in the member to be cushioned to engage the sides of said opening and which abut each other more or less closely over the cross members.

4. In a device of the class described, a member having irregular portions on a surface thereof to be cushioned, and further having perforations between said irregular surface portions forming cross members, and a strip of cushion material having portions thereof entering the perforations, the sides of said portions of cushion material locking on the sides of the perforations, and the adjacent ends of said portions of cushion material being forced toward each other and toward the adjacent cross members by the conformation of the strip to the said surface irregularities of the member.

In witness whereof I have hereunto subscribed my name in the presence of two witnesses.

CLARENCE L. BAIR.

Witnesses:
C. B. WINSLOW,
WALDO V. TISCORNIA.